United States Patent
Buesing (12)

(10) Patent No.: US 11,203,422 B2
(45) Date of Patent: Dec. 21, 2021

(54) ROTOR ASSEMBLY FOR A ROTORCRAFT WITH TORQUE CONTROLLED COLLECTIVE PITCH

(71) Applicant: AIRBUS HELICOPTERS DEUTSCHLAND GMBH, Donauworth (DE)

(72) Inventor: Moritz Buesing, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 392 days.

(21) Appl. No.: 16/153,976

(22) Filed: Oct. 8, 2018

(65) Prior Publication Data

US 2019/0168868 A1 Jun. 6, 2019

(30) Foreign Application Priority Data

Dec. 5, 2017 (EP) .................................... 17400069

(51) Int. Cl.
*B64C 27/605* (2006.01)
*B64C 27/33* (2006.01)
(Continued)

(52) U.S. Cl.
CPC ............ *B64C 27/605* (2013.01); *B64C 27/33* (2013.01); *B64C 27/57* (2013.01); *B64C 27/39* (2013.01);
(Continued)

(58) Field of Classification Search
CPC ......... B64C 27/33; B64C 27/39; B64C 27/48; B64C 27/57; B64C 27/58; B64C 27/605;
(Continued)

(56) References Cited

U.S. PATENT DOCUMENTS

| 1,970,114 A | 8/1934 | Wiegand |
|---|---|---|
| 2,614,637 A | 10/1952 | Landgraf |

(Continued)

FOREIGN PATENT DOCUMENTS

| CN | 204916174 U | 12/2015 |
|---|---|---|
| EP | 0515998 A1 | 12/1992 |
| EP | 2279943 A1 | 2/2011 |

OTHER PUBLICATIONS

Korean Notice of Preliminary Rejection dated Aug. 5, 2019, Application No. 10-2018-0101938, Applicant Airbus Helicopters Deutschland GmbH, 5 Pages.

(Continued)

*Primary Examiner* — Brian P Wolcott
(74) *Attorney, Agent, or Firm* — Brooks Kushman P.C.

(57) ABSTRACT

A rotor assembly for a rotorcraft, comprising a rotor shaft, a torque transmission unit that is non-rotatably mounted to the rotor shaft, a rotor hub that is rotatably mounted to the rotor shaft via an associated angular displacement enabling component, and at least two rotor blades that are connected to the rotor hub, wherein the torque transmission unit is coupled to the at least two rotor blades on a rotor assembly outflow side via a pitch control unit, wherein the pitch control unit transmits to the at least two rotor blades torque that is applied from the rotor shaft to the torque transmission unit, and wherein the pitch control unit increases a respective pitch angle of the at least two rotor blades if the torque is increased.

20 Claims, 4 Drawing Sheets

(51) Int. Cl.
  *B64C 27/57* (2006.01)
  *B64C 27/48* (2006.01)
  *B64C 27/39* (2006.01)

(52) U.S. Cl.
  CPC ........ *B64C 27/48* (2013.01); *B64C 2201/108* (2013.01)

(58) Field of Classification Search
  CPC ...... B64C 2201/108; B64C 2027/7205; B64C 2027/7216
  See application file for complete search history.

(56) References Cited

U.S. PATENT DOCUMENTS

| | | | |
|---|---|---|---|
| 2,684,721 A * | 7/1954 | Lloyd | ..................... B64C 27/54 416/117 |
| 3,105,558 A | 10/1963 | Kell | |
| 3,508,841 A | 4/1970 | Derschmidt | |
| 4,093,400 A | 6/1978 | Rybicki | |
| 4,676,720 A * | 6/1987 | Niwa | ...................... B64C 27/51 416/134 A |
| 4,778,343 A | 10/1988 | Hahn et al. | |
| 5,259,729 A * | 11/1993 | Fujihira | ................. A63H 27/12 416/131 |
| 5,263,821 A | 11/1993 | Noehren et al. | |
| 9,914,535 B2 * | 3/2018 | Paulos | .................. B64C 39/028 |
| 10,377,478 B2 * | 8/2019 | Muren | .................... B64C 27/51 |
| 2019/0047689 A1 * | 2/2019 | Muren | .................. B64C 27/625 |
| 2019/0263514 A1 * | 8/2019 | Schmiedel | .............. B64C 27/39 |

OTHER PUBLICATIONS

European Search Report for European Application No. EP 17400069, Completed by the European Patent Office, dated Apr. 16, 2018, 7 pages.

* cited by examiner

ROTOR ASSEMBLY FOR A ROTORCRAFT WITH TORQUE CONTROLLED COLLECTIVE PITCH

CROSS-REFERENCE TO RELATED APPLICATIONS

This application claims priority to European patent application No. EP 17400069.5 filed on Dec. 5, 2017, the disclosure of which is incorporated in its entirety by reference herein.

BACKGROUND OF THE INVENTION

(1) Field of the Invention

The invention is related to a rotor assembly for a rotorcraft. Furthermore, the invention is related to a rotorcraft having such a rotor assembly.

2) Description of Related Art

Rotor assemblies of rotorcrafts are provided for producing thrust in a predetermined direction during operation of the rotorcrafts. The thrust produced by the rotor assemblies can be controlled in two different ways: either by controlling a respective rotation speed of a given rotor assembly, or by controlling a respective aerodynamic lift coefficient of a given aerodynamic profile of respective rotor blades of the given rotor assembly. The respective aerodynamic lift coefficient is usually controlled by adjusting an underlying pitch angle of the rotor blades in operation.

More specifically, the rotation speed of a given rotor assembly can be controlled by increasing or decreasing a respective torque transmitted from a rotor mast, i. e. rotor shaft of the given rotor assembly. Thereby, the rotation speed can be accelerated or decelerated. In this case, however, an underlying rotational moment of inertia of the given rotor assembly delays respective changes in the rotation speed, i. e. in acceleration or deceleration of the rotor shaft and, consequently, in increase or decrease of the rotation speed of the given rotor assembly.

The rotational moment of inertia grows with a factor $x^4$ if a respective geometric size of the given rotor assembly is scaled linearly by a factor x. In other words, the rotational moment of inertia grows with the factor x to the fourth power. Thus, even when beneficial scaling effects for bending stiffness and aerodynamics of rotor assemblies are generally used to reduce masses of large rotor assemblies, the rotational moment of inertia nevertheless grows much faster than a respectively selected scaling factor x.

Accordingly, a required torque for rotor control becomes prohibitively large for large rotor assemblies, i. e. rotor assemblies having a radius greater than 1 m. However, for small rotor assemblies, e. g. for drones with comparatively small rotor diameters between 50 mm and 500 mm, it may be beneficial to use thrust control by means of controlling the rotation speed of the rotor assemblies, as this can be done with the engine of the drones alone without requiring any additional actuators.

In contrast thereto, thrust control by means of pitch angle control requires that respective rotor assemblies are generally either actively or passively articulated. In actively articulated rotor assemblies, each associated rotor blade is articulated and controlled individually over its azimuth angle of rotation. This is generally known as cyclic pitch actuation, which generally requires complex, heavy and cost intensive pitch adjustment devices that are necessary to adjust each rotor blade individually by actively actuating each rotor blade.

More specifically, actively actuated rotor assemblies are usually not only provided with cyclic, but also with collective pitch adjustment devices in order to be effective regarding lift and drag. Thus, a homogeneous lift distribution over the azimuth angle of rotation of the rotor assemblies can be achieved even during operation in non-axial inflow fields. Examples for such actively actuated rotor assemblies with respective cyclic and collective pitch adjustment devices are described in the documents U.S. Pat. Nos. 2,684,721 and 3,508,841.

However, the cyclic and collective pitch adjustment devices are generally embodied with a comparatively great complexity and weight and require the implementation of cost-intensive, complex controlling mechanisms and surveillance means. More specifically, the cyclic and collective pitch adjustment devices usually comprise pitch control rods that are moved by a swashplate, or by an axially moveable ring around a respective rotor mast. These elements need to be moved by additional actuators, which therefore create extra costs.

The document U.S. Pat. No. 2,614,637 describes a rotor assembly of a helicopter that is provided with a cyclic and collective pitch adjustment device, and with an automatic rotor pitch adjustment mechanism on the basis of throttle setting and power, i. e. rotational speed of the rotor assembly in operation. More specifically, the rotor assembly comprises a plurality of rotor blades, each one being attached to an associated stub shaft that is angularly adjustable in a hub structure of the helicopter for pitch variation. The hub structure is joined to a vertically extending hollow shaft that is rotated in operation by an appropriate source of power of the helicopter. Each one of the rotor blades is connected via an associated arm to a collar, both of which define the cyclic and collective pitch adjustment device, wherein the collar is actively moveable by means of a resilient force applied thereto. Each one of the rotor blades is further connected to a counterweight via a bell crank lever, both of which define the automatic rotor pitch adjustment mechanism, wherein the bell crank lever is moveable by means of centrifugal forces acting on the counterweight in operation. Accordingly, the pitch of each one of the rotor blades is adjusted automatically in operation by means of the automatic rotor pitch adjustment mechanism and independent of the pitch of all other rotor blades. Thus, the rotor assembly is suitable to react positively on sudden variations of incoming wind or RPM and to counteract by de-/increasing the blades' angles of incident.

However, due to the required arms, collars, levers and counterweights, this combined cyclic and collective pitch adjustment device and automatic rotor pitch adjustment mechanism is comparatively complex, heavy and cost intensive. Furthermore, due to provision of the cyclic and collective pitch adjustment device and the automatic rotor pitch adjustment mechanism in combination, the resulting overall system is complicated, expensive and has a comparatively high weight.

The document U.S. Pat. No. 3,105,558 describes a passively actuated rotor assembly. More specifically, a variable pitch propeller is described that includes a hub having a straight spline connection with a centrally arranged drive shaft. The hub has an intermediate annular groove within which a pair of radially extending bearing struts are disposed. A blade support is journaled in a cup-shaped recess of each bearing strut by a roller bearing assembly. The root ends of the propeller blades are threadedly connected with the blade supports. The shank portion of each propeller blade is mounted within a control sleeve and keyed thereto. Each control sleeve is thus connected to rotate with its respective propeller blade about the longitudinal axis thereof. The propeller blades have equal areas on both sides of their longitudinal axes and thus may be termed balanced propeller blades. The hub is enclosed by a two-part housing including a front section and a rear section, the sections being connected together by bolts. The parting line between the sections is coincident with the longitudinal axes of the propeller blades and the outer end of each bearing strut is received in a slot formed in the front and rear sections and at the parting line therebetween. The hub is restrained against axial movement relative to the drive shaft by a nut which threadedly engages the shaft and abuts the front end of the hub. The housing is bearing supported on the hub by front and rear needle thrust bearings and front and rear radial bearings. The hub has a pair of bearing recesses, each of which receives a ball-like formation of a crank arm integral with each control sleeve. Each control sleeve is formed with a pair of substantially radial extensions, or abutments, wherein first extensions are engageable with the hub for determining the minimum pitch position of the propeller blades, and second extensions are engageable with the hub at the maximum pitch position. Each extension is formed with a ball socket for receiving a ball-like formation on the end of an associated link. The other end of the associated link has a ball-like formation which is disposed within a socket of a thrust ring. The thrust ring is supported for axial movement within the rear section of the propeller housing which contains a prestressed elastomeric ring. The thrust ring has a tang disposed in an axial slot in the housing section and thus is slidable axially relative thereto. The ring may be composed of rubber or any other suitable plastic having a controlled density whereby its elastic and deformation characteristics are such as to match the torque characteristics of the propeller. The propeller blades are retained in their maximum pitch positions by the prestressed elastomeric ring. When the drive shaft is rotated in the clockwise direction, rotation about the horizontal propeller axes is imparted to the blades and hence the propeller housing through the cranks on the control sleeves. The initial pre-stressing of the elastomeric ring acts in opposition to the torque input during normal operation. However, when the engine is accelerated such as during takeoff, or climbing, the increased input torque to which the blades are subjected rotates the blades about their longitudinal axes towards their minimum pitch positions whereat the first extensions engage the hub. During rotation of the propeller blades about their axes in the clockwise direction, the elastomeric ring is deformed due to movement of the thrust ring. The thrust ring also functions to coordinate the pitch adjusting movement of the two propeller blades. The variation in the pitch position of the propeller is responsive solely to the input torque of the drive shaft. Thus, when the input torque is reduced to the normal operating range, the elastomeric ring will reposition the propeller blades at their maximum pitch position where the second extensions engage the hub.

However, due to a comparatively high number of constituent components, this variable pitch propeller has a pitch adjustment mechanism that is comparatively complex, heavy and cost intensive. Furthermore, this pitch adjustment mechanism is only suitable for a high stiffness rotor assembly, where a respective frequency of the first lead-lag eigenmode, i. e. bending of the rotor blades within the plane of rotation relative to an associated rotor hub, is larger than two times a given rotational frequency of the rotor assembly.

This is, however, not applicable to large rotor assemblies, as the provided high stiffnesses lead to high bending loads, which would be prohibitively large. Furthermore, even for comparatively small rotor assemblies with a diameter of less than 2 m, occurring loads may become prohibitively large if the rotor assemblies are used in conditions with comparably large lateral flow speeds, i. e. with an angle between flow direction and rotation axis of more than 15°. This is generally the case for all rotorcrafts.

Accordingly, the pitch adjustment mechanism according to document U.S. Pat. No. 3,105,558 can generally not be applied to rotorcrafts. Exceptions may be rotorcrafts that fly at low speeds only, i. e. speeds of less than 50 kt, and that are equipped with a comparatively great number of small rotor assemblies, i. e. more than six rotor assemblies, or that are generally provided with comparatively small overall dimensions, i. e. a maximum takeoff weight of less than 500 kg.

Finally, when using the pitch adjustment mechanism according to document U.S. Pat. No. 3,105,558, an increased torque provided at the drive shaft, resp. the hub, leads to a decreased pitch angle and therefore to a lower thrust. This, however, counteracts the effect of the resulting change in thrust through a change in rotation speed due to the higher torque. Therefore, a required long-term change in thrust is only achievable with this pitch adjustment mechanism through a change of the rotation speed, and is even further delayed and weakened by that pitch adjustment mechanism. In fact, by using this pitch adjustment mechanism a respective pitch angle of the rotor blades is adapted to different axial inflow speeds during start, i. e. at high torque and low air inflow speed, as well as cruise, i. e. at low torque and high air inflow speed, but decreases an achievable controllability of the thrust.

The document U.S. Pat. No. 1,970,114 describes a comparable pitch adjustment device having a similar objective. However, in this pitch adjustment device the rotor hub and the rotor mast are firmly, i. e. non-rotatably connected to each other.

BRIEF SUMMARY OF THE INVENTION

It is, therefore, an object of the present invention to provide a new rotor assembly for a rotorcraft, which enables an improved thrust control through torque moment variation at an associated rotor shaft. It is a further object of the present invention to provide a rotorcraft with such a new rotor assembly.

This object is solved by a rotor assembly for a rotorcraft, the rotor assembly comprising the features of claim 1.

More specifically, according to the invention a rotor assembly for a rotorcraft comprises a rotor shaft, a torque transmission unit that is non-rotatably mounted to the rotor shaft, a rotor hub that is rotatably mounted to the rotor shaft via an associated angular displacement enabling component, and at least two rotor blades that are connected to the rotor hub and provided for creating an airstream from a rotor assembly inflow side via a respective rotor plane to a rotor assembly outflow side. The torque transmission unit is coupled to the at least two rotor blades on the rotor assembly outflow side via a pitch control unit. The pitch control unit transmits to the at least two rotor blades torque that is applied from the rotor shaft to the torque transmission unit.

Furthermore, the pitch control unit increases a respective pitch angle of the at least two rotor blades if the torque is increased.

According to one aspect, the torque is not directly applied from the rotor shaft to the rotor hub, but from the rotor shaft to the torque transmission unit, while the rotor hub is rotatably mounted to the rotor shaft, i. e. the rotor shaft may rotate relative to the rotor hub at least within predetermined limits. Preferably, the torque is applied from the rotor shaft through respective pitch link rods to the rotor hub. Therefore, one axial end of each pitch link rod is preferably connected to an associated cantilever arm, which is rigidly, i. e. non-rotatably, mounted to the rotor shaft, i. e. the rotor shaft may not rotate relative to the associated cantilever arm. The respective other axial end of each pitch link rod is preferably connected to a so-called pitch horn of an associated rotor blade. The pitch horn may be an integral part of the rotor blade or of an associated control cuff.

Advantageously, the rotor hub and the rotor shaft are separated from each other. Separated means that both components are de-coupled from each other, but that they are connected to each other through respective bearings, sliding surfaces, elastic springs, spherical bearings, four-point bearings and so on, which form direct connections from the rotor hub to the rotor shaft. These direct connections preferably do not transfer any torsion moment in the case e. g. of bearings and/or sliding surfaces, or only a part of the torsion moment, e. g. in the case of elastic springs, which is in the case of elastic springs preferably smaller than 95%. The remaining part of the torsion moment is transferred through the pitch link rods and the rotor blades to the rotor hub. Consequently, varying levels of torque applied from the rotor shaft to the rotor blades resp. the rotor hub via the cantilever arms and the pitch link rods will lead to varying rotation angles resp. angular displacements between the rotor shaft and the rotor hub.

According to one aspect, the pitch link rods are coupled to the rotor blades on the rotor assembly outflow side. More specifically, respective pitch axes of the rotor blades define a rotation plane or, more precisely, a corresponding rotation conus of the rotor assembly. The inflow side of the rotor assembly is also referred to as the front or upper side of the rotor plane, and the outflow side is also referred to as the rear or lower side. The intersection point between the rotation axis and the rotation plane forms the center of the rotor assembly.

Advantageously, a connection point between the pitch link rods and the associated pitch horns, or control cuffs, is located on the rear or lower side of the rotor plane, i. e. the outflow side. Advantageously, this leads to an increased pitch angle of the rotor blades if the torque applied from the rotor shaft to the rotor blades via the cantilever arms and the pitch link rods is increased. The increased pitch angle in turn leads to higher thrust.

According to one aspect, the pitch horns or control cuffs are firmly connected to the rotor blades at locations that are more distant from the rotor center than respective lead-lag hinge axes. These lead-lag hinge axes may be equivalent to virtual lead-lag axes for elastic lead-lag hinges, such as e. g. provided in so-called flexbeams. Furthermore, the connections points between the pitch horns or control cuffs and the pitch link rods are preferably arranged at locations that are more distant from the rotor center than the respective lead-lag hinges. This advantageously leads to increase of the pitch angles for lagging rotor blades, and decreased pitch angles for leading rotor blades. Accordingly, a blade by blade adjustment by lead-lag angle can be provided that leads to a dynamic damping of respective cyclic lead-lag and flapping amplitudes.

According to one aspect, a respective pitch angle of the rotor blades can be influenced resp. adjusted based on the torque that is applied from the rotor shaft to the rotor hub, i. e. the rotor blades. Therefore, different dimensions of a given rotor assembly must be considered, as described hereinafter. A first dimension that must be considered is the radial distance between the connection point of cantilever arm to an associated pitch link rod and the rotor shaft axis, which is referred to as L1 hereinafter. A second dimension that must be considered is a respective distance between a pitch horn connection point and a respective pitch axis of a rotor blade that is parallel to the rotation axis and referred to as L2. L2 is considered to be positive in a backwards direction from the rotor plane. A third dimension that must be considered is the distance between the pitch horn connection point and the pitch axis that is tangential to the rotation axis of the rotor shaft and that is referred to as L3 hereinafter. L3 is considered to be positive towards a respective leading edge of an associated rotor blade.

Advantageously, torque moment transfer can be adjusted by adjusting respective geometric lever ratios. This especially applies to an underlying ratio between L1 and L2, but also to a selected angle between a corresponding pitch link axis of the pitch link rods and the tangential direction around the rotor shaft axis at the connection points. This leads to a geometric transfer ratio of the displacement angle between rotor shaft and rotor hub to a pitch angle between the rotor blade and the rotor hub. A large transfer ratio means larger pitch angle changes for a given torque moment change.

Furthermore, the rotational stiffness around the rotor blade and the rotor hub, the rotational stiffness around the rotor shaft axis between the rotor hub and the rotor shaft and the lead-lag stiffness between the rotor blades and the rotor hub can be adjusted for adjusting the pitch angle. Increased rotational stiffnesses and decreased lead-lag stiffness advantageously lead to smaller changes of the displacement angle between the rotor shaft and the rotor hub due to changes of the torque moment. This means that decreased rotational stiffnesses and increased lead-lag stiffnesses lead to larger pitch angle changes for a given torque moment change.

Another manner of influencing the pitch angle consists in changing the aerodynamic pitch moment due to a change of the aerodynamic pitch angle. More specifically, an increase of this change of the aerodynamic pitch moment has the same effect as an increase in the rotational stiffnesses described above for constant flow conditions. However, this effect can allow a better adaptation to changes in the inflow speeds. Therefore, a respective aerodynamic shape of the rotor blade may be chosen such that change of the aerodynamic pitch moment due to an increased air inflow speed leads to a larger pitch angle, which is generally the case for the aerodynamic shape of most current rotorcraft rotors.

It is further noticeable that positive values for L3 increase an underlying flapping damping effect, a so-called delta3 angle. In contrast, negative values for L3 may cause further excitation of rotor blade flapping movement. Furthermore, a pitch horn location close to the leading edge of each rotor blade and, thus, large L3 values, limit a maximum pitch axis that can be introduced. Alternatively, limit stops for the pitch angle can be applied. Limiting the maximum pitch axis prevents advantageously static divergence of the rotor blades.

Advantageously, an increased rotor shaft torque will generally increase the rotation speed. With some delay, this will still change the thrust in addition to pitch control as described above.

Also advantageously, the new rotor assembly does not require provision of a swashplate as well as of additional actuators for thrust control. Furthermore, any delay of thrust control due to high rotational moment of inertia is prevented. In particular, with the inventive rotor assembly thrust control through torque moment variation can be advantageously increased. Likewise, dynamic stability for large rotors with low lead-lag stiffness can be enabled.

According to a preferred embodiment, the associated angular displacement enabling component is provided to enable at least an angular displacement of the rotor hub relative to the rotor shaft. The associated angular displacement enabling component comprises at least one of a radial bearing, sliding surfaces, elastic springs and/or radial lamellas.

According to a further preferred embodiment, the pitch control unit is coupled to each one of the at least two rotor blades via a respectively associated control cuff.

According to a further preferred embodiment, each one of the at least two rotor blades comprises a torsion element that is elastically deformable for pitch angle adjustment.

According to a further preferred embodiment, each one of the at least two rotor blades and its torsion element are formed as an integral component.

According to a further preferred embodiment, each one of the at least two rotor blades and the respectively associated control cuff are formed as an integral component.

According to a further preferred embodiment, each torsion element and the rotor hub are formed as an integral component.

According to a further preferred embodiment, each torsion element comprises elastic flapping hinge areas which are arranged closer to the rotor shaft than the associated lead-lag hinge areas.

According to a further preferred embodiment, each torsion element is mounted to the rotor hub at an associated lead-lag hinge area of the rotor hub.

According to a further preferred embodiment, the rotor hub comprises elastic flapping hinge areas which are arranged closer to the rotor shaft than the associated lead-lag hinge areas.

According to a further preferred embodiment, the pitch control unit comprises at least two pitch link rods. The torque transmission unit is coupled to each respectively associated control cuff via one of the at least two pitch link rods.

According to a further preferred embodiment, each respectively associated control cuff comprises on the rotor assembly outflow side a pitch horn that is coupled to the one of the at least two pitch link rods.

According to a further preferred embodiment, the pitch horn is arranged closer to a rotor blade leading edge than to a rotor blade trailing edge.

According to a further preferred embodiment, the torque transmission unit comprises at least two cantilever arms. A displacement angle in a range from −100° to +100° is formed between each one of the at least two cantilever arms and an associated one of the at least two rotor blades relative to the rotor shaft.

The present invention further provides a rotorcraft with at least one rotor assembly that is embodied as described above.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
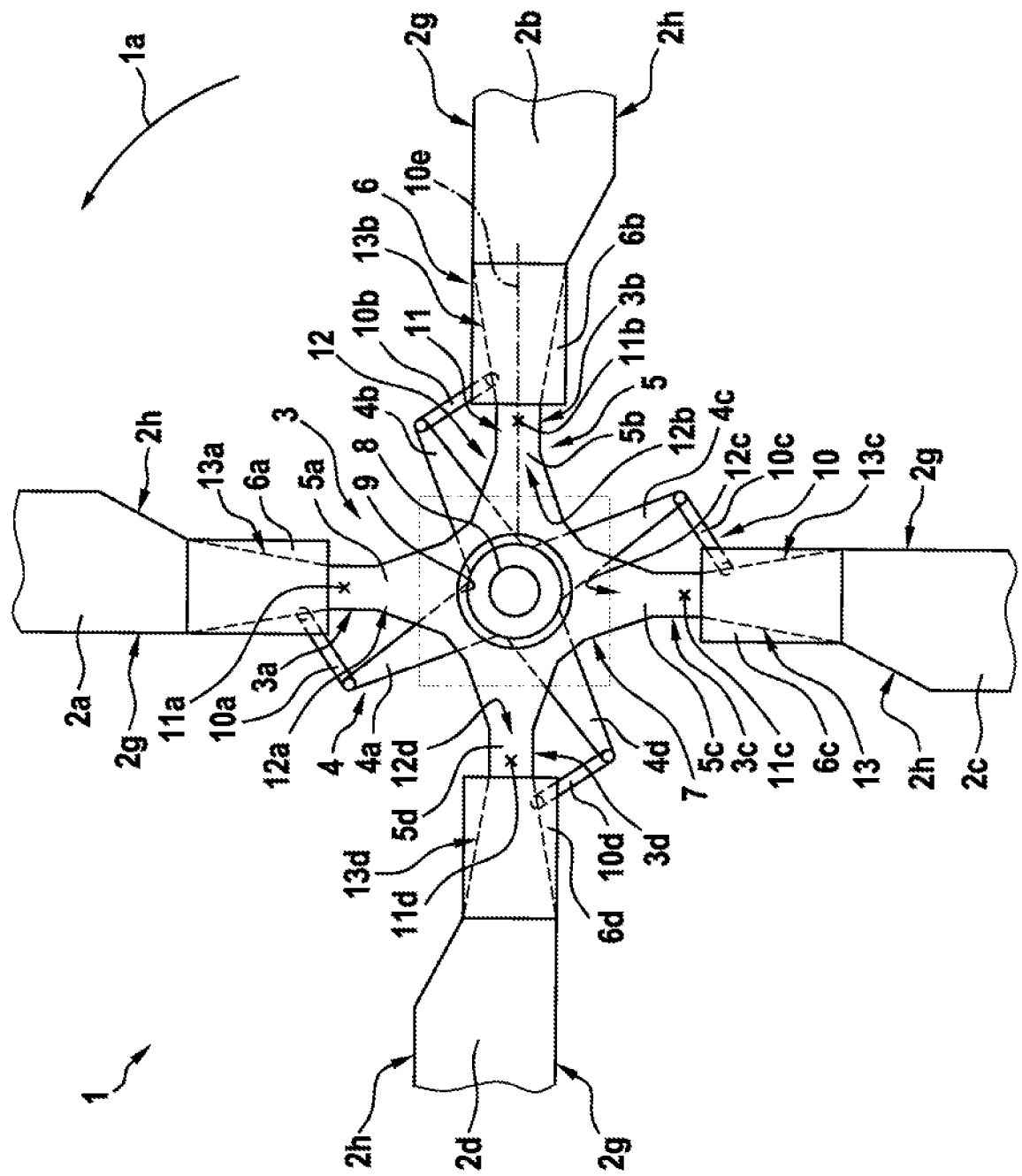
FIG. 1 shows a top view of a multi-blade rotor assembly with four exemplary rotor blades and a torque transmission unit according to the invention.

FIG. 1 shows a rotor assembly 1 for a rotorcraft. By way of example, the rotor assembly 1 is embodied as a multi-blade rotor assembly 1 of a rotary wing aircraft, in particular a multi-blade rotor assembly for a main rotor of a helicopter. According to one aspect, the multi-blade rotor assembly 1 comprises a rotor shaft 8 that is embodied with a rotor hub 7.

The multi-blade rotor assembly 1 is preferably embodied as a bearingless rotor assembly having a multiplicity of elastic hinge units 3 as interfaces between the rotor hub 7 and a plurality of rotor blades 2a, 2b, 2c, 2d. It should, however, be noted that these rotor blades 2a, 2b, 2c, 2d are not shown in greater detail, neither in FIG. 1 nor in the remaining figures, for simplicity and clarity of the drawings. Furthermore, it should be noted that the expression "multi-blade rotor assembly" should be construed in the context of the present invention such that it encompasses all rotor assemblies having at least two rotor blades.

The multiplicity of elastic hinge units 3 preferably comprises one elastic hinge unit for each rotor blade of the multi-blade rotor assembly 1. In other words, in the illustrated example four rotor blades 2a, 2b, 2c, 2d are provided and, thus, four elastic hinge units 3a, 3b, 3c, 3d are provided, each one being associated with an associated one of the rotor blades 2a, 2b, 2c, 2d.

More specifically, the multiplicity of elastic hinge units 3 preferably implements a multiplicity of torsion elements 5. In the illustrated example, four torsion elements 5a, 5b, 5c, 5d are implemented. Each one of the torsion elements 5a, 5b, 5c, 5d is associated with a given rotor blade of the plurality of rotor blades 2a, 2b, 2c, 2d.

According to one aspect, the rotor blades 2a, 2b, 2c, 2d and the torsion elements 5a, 5b, 5c, 5d, i.e. the elastic hinge units 3a, 3b, 3c, 3d, are implemented as integral components, so that they cannot be disconnected from each other. Moreover, the torsion elements 5a, 5b, 5c, 5d, i.e. the elastic hinge units 3a, 3b, 3c, 3d and the rotor hub 7 are preferably also implemented as integral components, so that they cannot be disconnected from each other. In other words, according to one aspect the rotor blades 2a, 2b, 2c, 2d, the torsion elements 5a, 5b, 5c, 5d, i.e. the elastic hinge units 3a, 3b, 3c, 3d, and the rotor hub 7 are implemented as a single integral component. However, it should be noted that these components may also be implemented as separate components, as illustrated by way of example in FIG. 2.

Preferably, each one of the torsion elements 5a, 5b, 5c, 5d is further associated with a control cuff of a multiplicity of controls cuffs 6, i. e. control cuffs 6a, 6b, 6c, 6d. Each one of the control cuffs 6a, 6b, 6c, 6d is preferably formed as an integral component of an associated one of the rotor blades 2a, 2b, 2c, 2d. However, alternatively each one of the control cuffs 6a, 6b, 6c, 6d can be mounted to the respective one of the rotor blades 2a, 2b, 2c, 2d in a conventional manner. These control cuffs 6a, 6b, 6c, 6d are preferably adapted for setting in operation of the multi-blade rotor assembly 1 a current pitch or blade angle of the rotor blades 2a, 2b, 2c, 2d by controlling a current torsion of the torsion elements 5a, 5b, 5c, 5d, i. e. of the elastic hinge units 3a, 3b, 3c, 3d. For instance, the control cuff 6d is drivable for setting the current pitch or blade angle of the rotor blade 2d by controlling the current torsion of the torsion element 5d, i. e. the current torsion of the elastic hinge unit 3d.

It should be noted that the term "control cuff" merely refers to a control element that is suitable for controlling a respective pitch angle of an associated one of the rotor blades 2a, 2b, 2c, 2d. In other words, the control cuff may be embodied as a control bag, i. e. a conus-shaped bag that encompasses completely at least a portion of an associated one of the torsion elements 5a, 5b, 5c, 5d. However, alternatively and by way of example, each one of the control cuffs 6a, 6b, 6c, 6d may also be embodied as a beam-shaped element, which is arranged e. g. in parallel to a given one of the rotor blades 2a, 2b, 2c, 2d, i. e. a given one of the elastic hinge units 3a, 3b, 3c, 3d.

Preferably, the elastic hinge units 3a, 3b, 3c, 3d comprise associated lead-lag hinge areas 11a, 11b, 11c, 11d, which form a multiplicity of lead-lag hinge areas 11. The multiplicity of lead-lag hinge areas 11 is provided to allow lead-lag motion of the rotor blades 2a, 2b, 2c, 2d.

Furthermore, the elastic hinge units 3a, 3b, 3c, 3d preferably comprise associated elastic flapping hinge areas 12a, 12b, 12c, 12d, which form a multiplicity of elastic flapping hinge areas 12. The multiplicity of elastic flapping hinge areas 12 is provided to enable flapping motions of the rotor blades 2a, 2b, 2c, 2d. Preferably, each one of the elastic flapping hinge areas 12a, 12b, 12c, 12d is arranged closer to the rotor shaft 8 than the associated ones of the lead-lag hinge areas 11a, 11b, 11c, 11d.

Moreover, the elastic hinge units 3a, 3b, 3c, 3d preferentially comprise associated elastic torsion areas 13a, 13b, 13c, 13d, which form a multiplicity of elastic torsion areas 13. The multiplicity of elastic torsion areas 13 is provided to enable pitch angle control of the rotor blades 2a, 2b, 2c, 2d.

However, it should be noted that according to the present invention only the multiplicity of elastic torsion areas 13 is mandatory, while the multiplicity of lead-lag hinge areas 11 and the multiplicity of elastic flapping hinge areas 12 are optional and may be omitted dependent of an underlying type of multi-blade rotor assembly that is to be implemented.

Furthermore, it should be noted that any one of the lead-lag hinge areas 11a, 11b, 11c, 11d, the elastic flapping hinge areas 12a, 12b, 12c, 12d, and the elastic torsion areas 13a, 13b, 13c, 13d may be implemented as an elastic resp. virtual hinge or as an articulated hinge. Accordingly, the elastic hinge units 3a, 3b, 3c, 3d may by implemented by means of fully elastic flexbeam, by elastomeric bearings and/or conventional bearings, as described below with reference to FIG. 2 by way of example with respect to the lead-lag hinge areas 11a, 11b, 11c, 11d.

According to one aspect of the present invention, the rotor hub 7 is rotatably mounted to the rotor shaft 8 via an associated angular displacement enabling component 9. The associated angular displacement enabling component 9 is preferably provided to enable at least an angular displacement of the rotor hub 7 relative to the rotor shaft 8. Therefore, the associated angular displacement enabling component 9 preferentially comprises at least one of a radial bearing, sliding surfaces, elastic springs and/or radial lamellas (18 in FIG. 4). However, it should be noted that the specific angular displacement enabling components that are cited above are merely mentioned by way of example and not for limiting the present invention accordingly. Instead, any other angular displacement enabling component that is suitable to allow a relative rotational movement between the rotor hub 7 and the rotor shaft 8 is likewise contemplated, such as e. g. a spherical bearing and/or a so-called four-point bearing.

Figure 3:
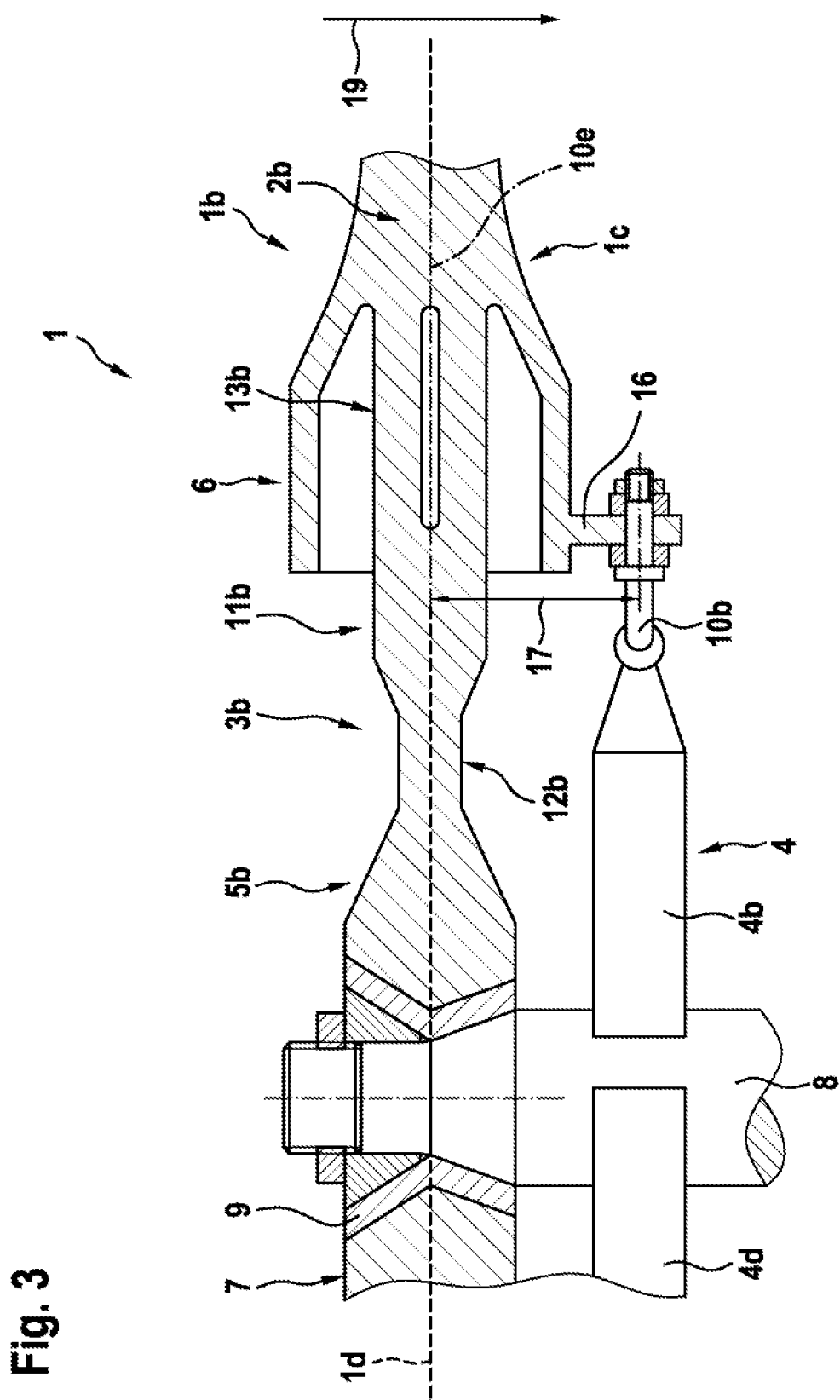
FIG. 3 shows a sectional view of a portion of the multi-blade rotor assembly of FIG. 1 with only two exemplary rotor blades and the torque transmission unit.

The rotor hub 7 and the rotor blades 2a, 2b, 2c, 2d illustratively define a rotor plane (1d in FIG. 3). The rotor blades 2a, 2b, 2c, 2d are preferably provided for creating an airstream (19 in FIG. 3) from a rotor assembly inflow side (1b in FIG. 3) to a rotor assembly outflow side (1c in FIG. 3). In FIG. 1, the multi-blade rotor assembly 1 is shown in a viewing direction directed from the rotor assembly inflow side towards the rotor plane.

According to one aspect, the multi-blade rotor assembly 1 further comprises a torque transmission unit 4 that is non-rotatably mounted to the rotor shaft 8. Preferably, the torque transmission unit 4 is coupled to the rotor blades 2a, 2b, 2c, 2d on the rotor assembly outflow side. More specifically, the torque transmission unit 4 is coupled to the rotor blades 2a, 2b, 2c, 2d via an associated pitch control unit 10, which is provided for transmitting to the rotor blades 2a, 2b, 2c, 2d a torque that is applied from the rotor shaft 8 to the torque transmission 4. The pitch control unit 10 preferably increases a respective pitch angle of the rotor blades 2a, 2b, 2c, 2d by rotating the rotor blades 2a, 2b, 2c, 2d around associated pitch axes if the torque applied to the rotor blades 2a, 2b, 2c, 2d is increased.

It should be noted that for simplicity and clarity of the drawings only with respect to the rotor blade 2b a single pitch axis 10e is illustrated and labelled. This pitch axis 10e should be considered as being representative for all pitch axes of all rotor blades 2a, 2b, 2c, 2d.

According to one aspect, the multi-blade rotor assembly 1 is embodied for rotation in a predetermined rotation direction that is exemplarily indicated and labelled with an arrow 1a. Consequently, each one of the rotor blades 2a, 2b, 2c, 2d comprises an associated leading edge 2g and an associated trailing edge 2h. Preferably, the leading edge 2g of each one of the rotor blades 2a, 2b, 2c, 2d is coupled to the pitch control unit 10. More generally, the latter is preferentially coupled to each one of the rotor blades 2a, 2b, 2c, 2d at a position that is at least closer to the leading edge 2g than to the trailing edge 2h.

More specifically, according to one aspect the pitch control unit 10 comprises at least two pitch link rods that are coupled to the torque transmission unit 4. By way of example, the pitch control unit 10 comprises four pitch link rods 10a, 10b, 10c, 10d which are coupled to the torque transmission unit 4. Illustratively, the torque transmission unit 4 comprises four cantilever arms 4a, 4b, 4c, 4d that are non-rotatably mounted to the rotor shaft 8. Preferably, the cantilever arms 4a, 4b, 4c, 4d define a star-shaped or X-shaped structure that is non-rotatably mounted to the rotor shaft 8. The cantilever arms 4a, 4b, 4c, 4d preferably comprise outer ends, i. e. radially outer ends, which are connected to the pitch link rods 10a, 10b, 10c, 10d, respectively. The pitch link rods 10a, 10b, 10c, 10d are further connected to associated ones of the rotor blades 2a, 2b, 2c, 2d.

More specifically, the pitch link rods 10a, 10b, 10c, 10d preferably connect the radial outer ends of the cantilever arms 4a, 4b, 4c, 4d to respective ones of the control cuffs 6a, 6b, 6c, 6d of the rotor blades 2a, 2b, 2c, 2d. The cantilever arms 4a, 4b, 4c, 4d are preferably angularly displaced with respect to the rotor blades 2a, 2b, 2c, 2d, i. e. the pitch axes of the rotor blades 2a, 2b, 2c, 2d, by a displacement angle ranging from −100° to +100°. By way of example and representatively for all displacement angles, the cantilever arm 4b is illustratively angularly displaced with respect to the pitch axis 10e of the rotor blade 2b by a displacement angle of approximately +30°.

It should be noted that the range of the displacement angle from −100° to +100° is indicated with respect to the rotation direction 1a of the multi-blade rotor assembly 1. In other words, if the cantilever arm 4a, 4b, 4c, 4d advances the rotor blade 2a, 2b, 2c, 2d in the rotation direction 1a, the displacement angle is positive. If, however, the cantilever arm 4a, 4b, 4c, 4d follows the associated one of the rotor blades 2a, 2b, 2c, 2d in the rotation direction 1a, then the displacement angle is negative.

Figure 2:
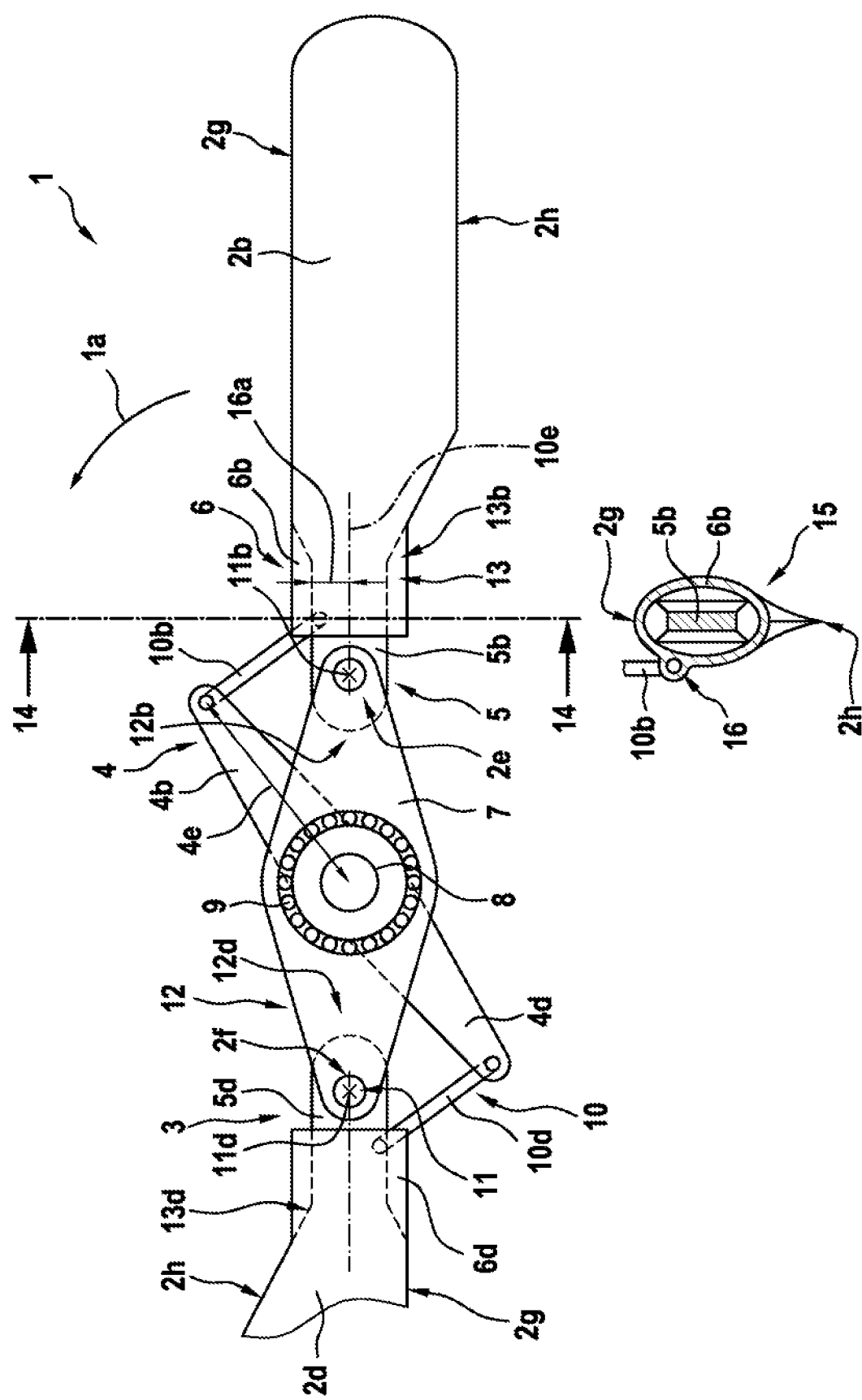
FIG. 2 shows a top view of the multi-blade rotor assembly of FIG. 1 with only two exemplary rotor blades and the torque transmission unit according to a variant.

FIG. 2 shows the multi-blade rotor assembly 1 of FIG. 1, which is illustratively embodied according to a variant of the present invention. More specifically, in contrast to FIG. 1, the multi-blade rotor assembly 1 now only comprises the two rotor blades 2b, 2d, as well as the cantilever arms 4b, 4d and the pitch link rods 10b, 10d. Furthermore, also the rotor hub 7 is simplified and only approximately oval, as it now merely interconnects the two rotor blades 2b, 2d and no more the four rotor blades 2a, 2b, 2c, 2d as illustrated in FIG. 1.

As described above with respect to FIG. 1, the rotor hub 7 is rotatably mounted to the rotor shaft 8 via the associated angular displacement enabling component 9. Illustratively, the latter is embodied as a roller bearing and, more particularly, as a ball bearing, which allows a rotation of the rotor hub 7 around the rotor shaft 8. However, all other five degrees of freedom, all displacements, and both rotation directions normal to the rotor shaft 8, i. e. the rotation axis of the rotor shaft 8, are constrained through the ball bearing 9.

According to one aspect, the rotor hub 7 is now connected through articulated lead-lag bearings that implement the multiplicity of lead-lag hinge areas 11 of FIG. 1 to the rotor blades 2b, 2d. These articulated lead-lag bearings are preferably implemented by means of sliding bearings and/or elastomeric springs, which advantageously lead to additional lead-lag damping through friction. Furthermore, such articulated lead-lag bearings provide a required minimum lead-lag stiffness for rotor start-up without the stabilizing centrifugal force.

According to one aspect, the articulated lead-lag bearings that implement the multiplicity of lead-lag hinge areas 11 connect the rotor hub 7 at associated blade connecting points 2e, 2f to the torsion elements 5b, 5d of the rotor blades 2b, 2d, respectively. By way of example, the torsion elements 5b, 5d are implemented as an integral part of the respectively associated rotor blades 2b, 2d. Furthermore, they are illustratively encompassed, i. e. surrounded by the respectively associated control cuffs 6b, 6d of FIG. 1. This is further illustrated by a cut view 15 that is shown in direction of a cut line 14.

However, it should be noted that the torsion elements 5b, 5d must not necessarily be implemented as an integral part of the rotor blades 2b, 2d. Instead, they may be implemented as separate components that are rigidly attached in any suitable manner to the rotor blades 2b, 2d. Likewise, the control cuffs 6b, 6d must not necessarily encompass resp. surround the torsion elements 5b, 5d. Instead, they may also be provided as e. g. beam-shaped components that are at least partly arranged in parallel to the torsion elements 5b, 5d. Finally, it should be noted that also the control cuffs 6b, 6d must not necessarily be integrated into the rotor blades 2b, 2d, but they may likewise be implemented as separate components that are only rigidly attached to the rotor blades 2b, 2d as well as to the torsion elements 5b, 5d.

According to one aspect, the control cuffs 6b, 6d and, more specifically, the multiplicity of control cuffs 6 of FIG. 1, are provided with an associated pitch horn 16, respectively. This pitch horn is illustrated in detail in the cut view 15 with respect to the control cuff 6b. However, it should be noted that this illustration is only representative for each one of the pitch horns 16 of each one of the multiplicity of control cuffs 6.

As can be seen from the cut view 15, the pitch horn 16, which may also be referred to as a control horn, is arranged on the control cuff 6b at a location that is closer to the leading edge 2g of the rotor blade 2b, than to the trailing edge 2h thereof. In other words, a respective connection point between the pitch link rod 10b and the pitch horn 16 of the control cuff 6b is not directly behind the pitch axis 10e of the rotor blade 2b, but it is shifted towards the leading edge 2g of the rotor blade 2b in order to increase a corresponding flapping damping effect. A respective distance between the connection point, i. e. the location of the pitch horn 16, and the pitch axis 10e is illustratively shown by means of a respective pitch offset 16a.

It should be noted that positive values for the respective pitch offset 16a increase an underlying flapping damping effect, a so-called delta3 angle. In contrast, negative values for the respective pitch offset 16a may cause further excitation of rotor blade flapping movement. Furthermore, a pitch horn location close to the leading edge 2g of the rotor blade 2b and, thus, large values of the respective pitch offset 16a, limit a maximum pitch axis that can be introduced. Alternatively, limit stops for the pitch angle can be applied. Limiting the maximum pitch axis prevents static divergence of the rotor blade 2b.

The pitch horns 16 on the rotor blades 2b, 2d are connected via the pitch link rods 10b, 10d to the cantilever arms 4b, 4d. The cantilever arms 4b, 4d are rigidly attached to opposite sides of the rotor shaft 8. Preferably, the cantilever arms 4b, 4d extend radially outwards, at least roughly in parallel to the rotation plane (1d in FIG. 3) of the multi-blade rotor assembly 1. In particular, the cantilever arms 4b, 4d preferably are arranged on the outflow side (1c in FIG. 3) of the multi-blade rotor assembly 1.

As described above with reference to FIG. 1, a respective displacement angle between longitudinal extensions of the cantilever arms 4b, 4d, and the rotor blades 2b, 2d, i. e. of the pitch axis 10e of the rotor blades 2b, 2d, of illustratively 30° with respect to the leading edges 2g of the rotor blades 2b, 2d is embodied. However, it should be noted that this respective displacement angle more generally amounts to a value in a range of −100° to +100°. More specifically, if the respective displacement angle has a positive value, that means that the cantilever arms 4b, 4d advance the rotor blades 2b, 2d in the rotation direction 1a of the multi-blade rotor assembly 1, while a negative value of the respective displacement angle means that the rotor blades 2b, 2d follow the cantilever arms 4b, 4d in the rotation direction 1a. Illustratively, each one of the cantilever arms 4b, 4d has an at least within predetermined manufacturing tolerances identical arm length 4e, which is for simplicity and clarity of the drawings only illustrated for the cantilever arm 4b.

According to one aspect, torque moment transfer from the rotor shaft 8 to the rotor blades 2b, 2d can be adjusted by adjusting a selected displacement angle between longitudinal extensions of the cantilever arms 4b, 4d, and the rotor blades 2b, 2d, i. e. the pitch axis 10e of the rotor blades 2b, 2d. This leads to a geometric transfer ratio of the selected displacement angle between the rotor shaft 8 and the rotor hub 7 to a pitch angle between the rotor blades 2b (and 2d of FIG. 2) and the rotor hub 7. A large transfer ratio means larger pitch angle changes for a given torque moment change.

In operation of the multi-blade rotor assembly 1, torque that is applied from the rotor shaft 8 to the cantilever arms 4b, 4d forces the cantilever arms 4b, 4d to rotate in the rotation direction 1a. Thus, the cantilever arms 4b, 4d entrain the rotor blades 2b, 2d by means of the pitch link rods 10b, 10d, which are connected to the control cuffs 6b, 6d via the respective pitch horns 16. The torque that is thus applied by the rotor shaft 8 increases the pitch angle of the rotor blades 2b, 2d and also increases a respective rotation speed of the multi-blade rotor assembly 1, thereby leading to tension loads in the pitch link rods 10b, 10d. Applying negative torque to the rotor shaft 8, however, decreases the pitch angles of the rotor blades 2b, 2d and slows the rotation speed of the multi-blade rod assembly 1 down, thereby leading to compression loads in the pitch link rods 10b, 10d. Therefore, in this arrangement corresponding peak tension loads in the pitch link rods 10b, 10d should generally be larger than corresponding peak compression loads, due to the aerodynamic drag of the rotor blades 10b, 10d.

FIG. 3 shows a part of the multi-blade rotor assembly 1 according to the configuration illustrated in FIG. 1 for further illustrating an inflow side 1b of the multi-blade rotor assembly 1, as well as an outflow side 1c of the multi-blade rotor assembly 1. More specifically, the multi-blade rotor assembly 1 illustratively defines a rotor plane 1d and the rotor blades 2b (and 2d of FIG. 1) are provided for creating an airstream 19 from the inflow side 1b via the rotor plane 1d to the outflow side 1c.

FIG. 3 also further illustrates a preferred, non-rotatable mounting of the cantilever arms 4b, 4d of the torque transmission unit 4 to the rotor shaft 8 as well as one embodiment of the angular displacement enabling component 9, according to which the latter is implemented by means of an elastomeric bearing. FIG. 3 also further illustrates arrangement of the pitch horn 16 according to FIG. 2 on the outflow side 1c of the multi-blade rotor assembly 1. More specifically, the pitch horn 16 is arranged such on the outflow side 1c that a vertical offset 17 between the rotor plane 1d and a connection point to the pitch rod link 10b is created.

According to one aspect, torque moment transfer from the rotor shaft 8 to the rotor blades 2b (and 2d of FIG. 1) can be adjusted by adjusting respective geometric lever ratios, i. e. an underlying ratio between the cantilever arm length 4e according to FIG. 2 and the vertical offset 17. This leads to a geometric transfer ratio of the displacement angle between the rotor shaft 8 and the rotor hub 7 to a pitch angle between the rotor blades 2b (and 2d of FIG. 1) and the rotor hub 7. A large transfer ratio means larger pitch angle changes for a given torque moment change.

Figure 4:
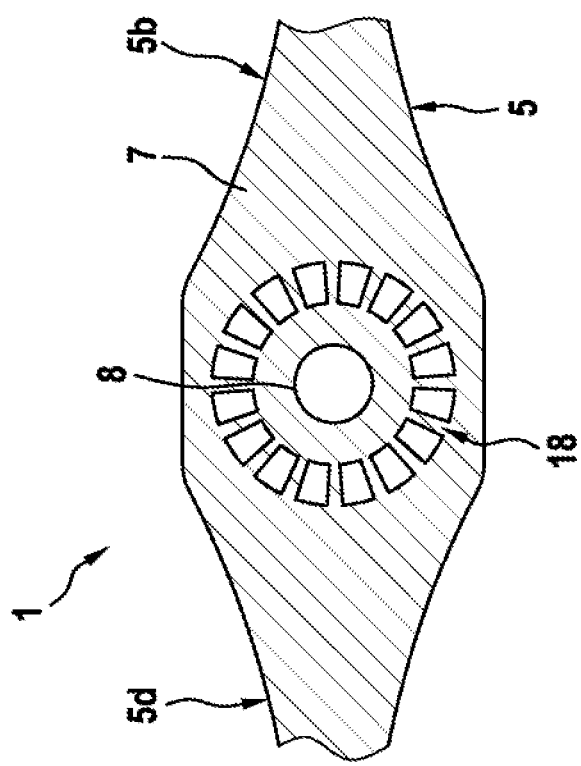
FIG. 4 shows a sectional view of a rotor hub according to one aspect.

FIG. 4 shows the rotor hub 7 of FIG. 2 and FIG. 3 according to a variant of the present invention. According to this variant, the angular displacement enabling component 9 of the preceding figures is embodied resp. replaced by means of radial lamellas 18. The latter enable a relative movement between the rotor hub 7 and the rotor shaft 8.

It should be noted that the above described embodiments are merely described to illustrate possible variants of the present invention, but not in order to restrict the present invention thereto. Instead, multiple modifications and variations of the invention are possible and should, therefore, also be considered as being part of the invention. For instance, the multi-blade rotor assembly 1 of FIG. 1 to FIG. 3 is exemplarily embodied for rotation into the rotation direction 1a of FIG. 1. If, however, the multi-blade rotor assembly 1 of FIG. 1 to FIG. 3 should be embodied for rotation into a rotation direction that is opposite to the rotation direction 1a of FIG. 1, then the multi-blade rotor assembly 1 is simply to be mirrored in this opposite rotation direction.

REFERENCE LIST 1 multi-blade rotor assembly
1a rotation direction
1b rotor assembly inflow side
1c rotor assembly outflow side
1d rotor plane
2a, 2b, 2c, 2d rotor blades
2e, 2f blade connecting points
2g rotor blade leading edge
2h rotor blade trailing edge
3 multiplicity of elastic hinge units
3a, 3b, 3c, 3d elastic hinge units
4 torque transmission unit
4a, 4b, 4c, 4d cantilever arms
4e cantilever arm length
5 multiplicity of torsion elements
5a, 5b, 5c, 5d torsion elements
6 multiplicity of control cuffs
6a, 6b, 6c, 6d control cuffs
7 rotor hub
8 rotor shaft
9 angular displacement enabling component
10 pitch control unit
10a, 10b, 10c, 10d pitch link rods
10e pitch axis
11 multiplicity of lead-lag hinge areas
11a, 11b, 11c, 11d lead-lag hinge areas
12 multiplicity of elastic flapping hinge areas
12, 12b, 12c, 12d elastic flapping hinge areas
13 multiplicity of elastic torsion areas
13a, 13b, 13c, 13d elastic torsion areas
14 cut line
15 cut view
16 pitch horn
16a pitch horn offset
17 vertical offset
18 radial lamellas

What is claimed is:

1. A rotor assembly for a rotorcraft, comprising a rotor shaft, a torque transmission unit mounted to the rotor shaft, a rotor hub that is mounted to the rotor shaft by an associated angular displacement enabling component, and at least two rotor blades connected to the rotor hub and provided for creating an airstream from a rotor assembly inflow side via a respective rotor plane to a rotor assembly outflow side, wherein each one of the at least two rotor blades comprises a torsion element that is elastically deformable for pitch angle adjustment, wherein the torque transmission unit is coupled to the at least two rotor blades on the rotor assembly outflow side via a pitch control unit, wherein the pitch control unit transmits to the at least two rotor blades torque that is applied from the rotor shaft to the torque transmission unit, and wherein the pitch control unit increases a respective pitch angle of the at least two rotor blades if the torque is increased, wherein the associated angular displacement enabling component is provided to enable at least an angular displacement of the rotor hub relative to the rotor shaft, the associated angular displacement enabling component comprising at least one of a radial bearing, sliding surfaces, elastic springs and/or radial lamellas.

2. The rotor assembly of claim 1,
wherein the pitch control unit is coupled to each one of the at least two rotor blades via a respectively associated control cuff.

3. The rotor assembly of claim 2,
wherein each one of the at least two rotor blades and its torsion element are formed as an integral component, wherein each one of the at least two rotor blades and the respectively associated control cuff are formed as an integral component.

4. The rotor assembly of claim 1,
wherein each torsion element and the rotor hub are formed as an integral component.

5. The rotor assembly of claim 1,
wherein each torsion element comprises elastic flapping hinge areas which are arranged closer to the rotor shaft than associated lead-lag hinge areas.

6. The rotor assembly of claim 1,
wherein each torsion element is mounted to the rotor hub at an associated lead-lag hinge area of the rotor hub.

7. The rotor assembly of claim 6,
wherein the rotor hub comprises elastic flapping hinge areas which are arranged closer to the rotor shaft than the associated lead-lag hinge areas.

8. The rotor assembly of claim 2,
wherein the pitch control unit comprises at least two pitch link rods, the torque transmission unit being coupled to each respectively associated control cuff via one of the at least two pitch link rods.

9. The rotor assembly of claim 8,
wherein each respectively associated control cuff comprises on the rotor assembly outflow side a pitch horn that is coupled to the one of the at least two pitch link rods.

10. The rotor assembly of claim 9, wherein each of the pitch horns is arranged closer to a rotor blade leading edge than to a rotor blade trailing edge.

11. The rotor assembly of claim 1,
wherein the torque transmission unit comprises at least two cantilever arms, and wherein an angular displacement in a range from −100° to +100° is formed between each one of the at least two cantilever arms and an associated one of the at least two rotor blades relative to the rotor shaft.

12. A rotorcraft with at least one rotor assembly that is embodied according to claim 1.

13. A rotor assembly for a rotorcraft, the rotor assembly comprising:
a rotor shaft;
a torque transmitter non-rotatably mounted to the rotor shaft;
a rotor hub;
an angular displacement enabling component rotatably mounting the rotor hub to the rotor shaft;
at least two rotor blades connected to the rotor hub for creating an airstream from a rotor assembly inflow side via a respective rotor plane to a rotor assembly outflow side; and
a pitch controller coupling the torque transmitter to the at least two rotor blades on the rotor assembly outflow side, the pitch controller capable of transmitting to the at least two rotor blades torque applied from the rotor shaft to the torque transmitter, and wherein the pitch controller is capable of increasing a respective pitch angle of the at least two rotor blades if the torque is increased, wherein the angular displacement enabling component is capable of enabling at least an angular displacement of the rotor hub relative to the rotor shaft, the angular displacement enabling component comprising at least one of elastic springs and/or radial lamellas.

14. The rotor assembly of claim 13,
wherein the pitch controller is coupled to each one of the at least two rotor blades via a respectively associated control cuff,
wherein each one of the at least two rotor blades comprises an elastically deformable torsion member for pitch angle adjustment.

15. The rotor assembly of claim 14,
wherein each torsion member and the rotor hub are formed as an integral component.

16. The rotor assembly of claim 14,
wherein each torsion member comprises elastic flapping hinge areas arranged closer to the rotor shaft than associated lead-lag hinge areas, and wherein each torsion member is mounted to the rotor hub at an associated lead-lag hinge area of the rotor hub.

17. A rotorcraft with at least one rotor assembly according to claim 13.

18. The rotor assembly of claim 1, wherein the torque transmission unit comprises at least two cantilever arms that are non-rotatably mounted to the rotor shaft, and wherein an angular displacement in a range of −100° to +100° is formed between each one of the at least two cantilever arms and an associated one of the at least two rotor blades to the rotor shaft.

19. A rotor assembly for a rotorcraft, comprising a rotor shaft, a torque transmission unit that is non-rotatably mounted to the rotor shaft, a rotor hub that is directly rotatably mounted to the rotor shaft by an associated angular displacement enabling component, and at least two rotor blades that are connected to the rotor hub and provided for creating an airstream from a rotor assembly inflow side via a respective rotor plane to a rotor assembly outflow side, wherein the torque transmission unit is coupled to the at least two rotor blades on the rotor assembly outflow side via a pitch control unit, wherein the pitch control unit transmits to the at least two rotor blades torque that is applied from the rotor shaft to the torque transmission unit, and wherein the pitch control unit increases a respective pitch angle of the at least two rotor blades if the torque is increased, wherein the associated angular displacement enabling component is provided to enable at least an angular displacement of the rotor hub relative to the rotor shaft, the associated angular displacement enabling component comprising at least one of a radial bearing, sliding surfaces, elastic springs and/or radial lamellas,
wherein each one of the at least two rotor blades comprises a torsion element that is elastically deformable for pitch angle adjustment.

20. The rotor assembly of claim 19,
wherein the pitch control unit is coupled to each one of the at least two rotor blades via a respectively associated control cuff, wherein each torsion element is mounted to the rotor hub at an associated lead-lag hinge area of the rotor hub, and wherein the pitch control unit comprises at least two pitch link rods, the torque transmission unit being coupled to each respectively associated control cuff via one of the at least two pitch link rods.

* * * * *